(No Model.)
J. WILKINSON & F. CURTIN.
COTTON CULTIVATOR.
No. 337,222. Patented Mar. 2, 1886.
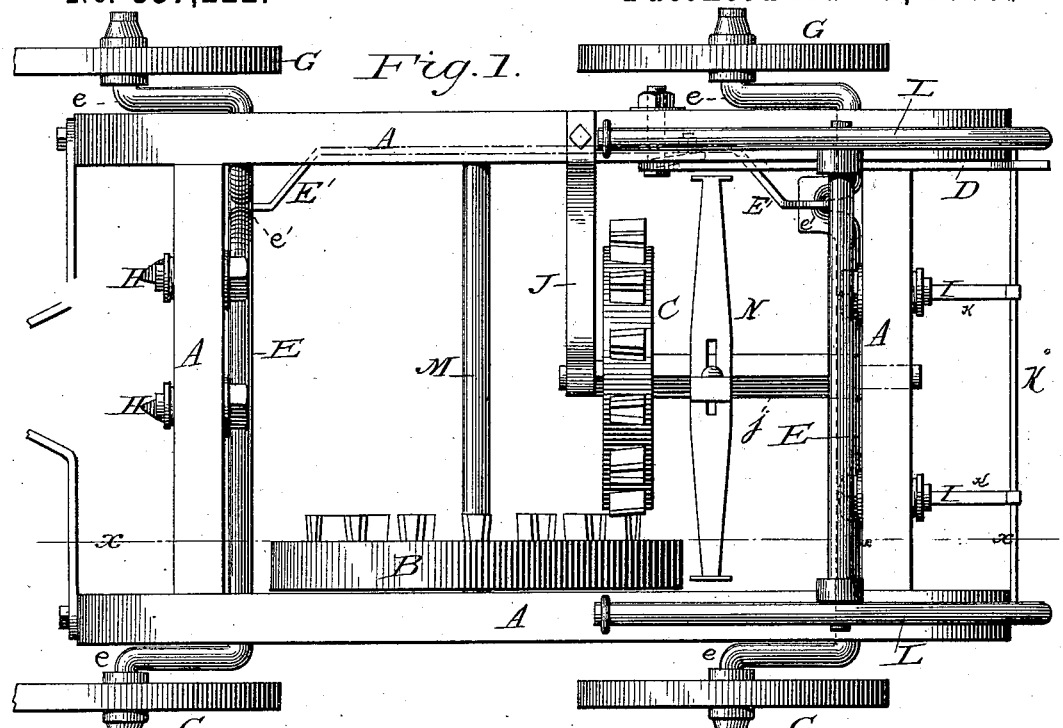
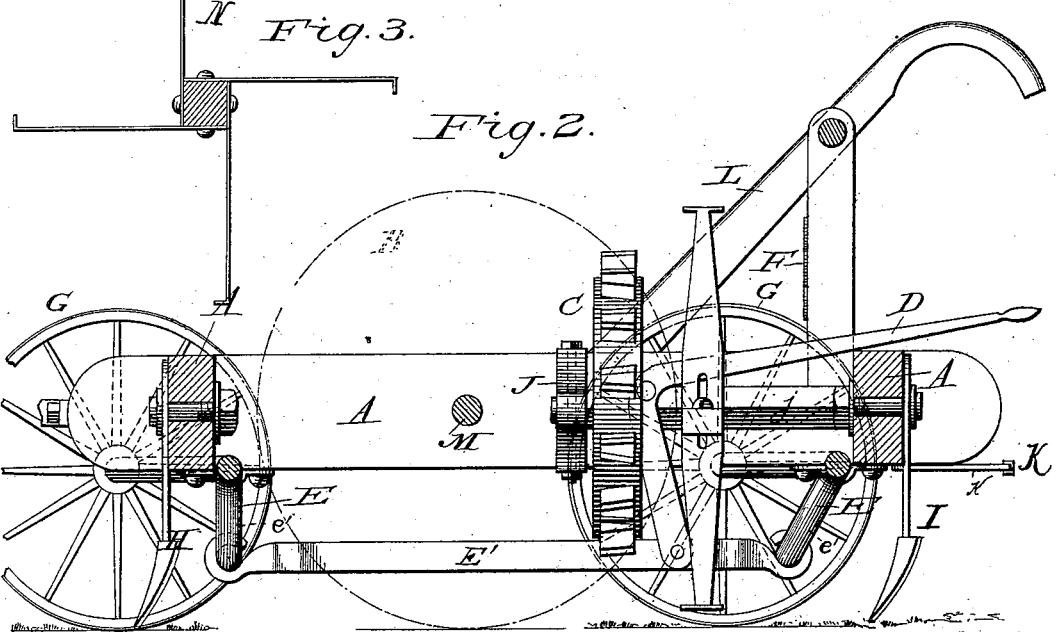
Witnesses:
James A. Wright
X. H. Bagley
Inventor:
Jasper Wilkinson
Frank Curtin

UNITED STATES PATENT OFFICE.

JASPER WILKINSON AND FRANK CURTIN, OF KENTUCK, ALABAMA.

COTTON-CUTIVATOR.

SPECIFICATION forming part of Letters Patent No. 337,222, dated March 2, 1886.

Application filed July 1, 1885. Serial No. 170,652. (No model.)

*To all whom it may concern:*

Be it known that we, JASPER WILKINSON and FRANK CURTIN, citizens of the United States, residing in Kentuck, in the county of Talladega and State of Alabama, have invented certain new and useful Improvements in Cotton-Cultivators, of which the following is a description.

Our invention is an improved cotton-cultivating machine, and has for an object to provide a machine by which the cotton may be cultivated and chopped to stands; and it consists in certain novel constructions and combinations of parts, as will be hereinafter described and claimed.

In the drawings, Figure 1 is a top plan view of our machine, and Fig. 2 is a longitudinal section thereof on line x x, Fig. 1. Fig. 3 is a view of the chopper.

The axles E are journaled in the main frame A, and have end crank-spindles e for the wheels G. These axles also have cranks e', which are connected by a pitman or link, E', which is connected with the lever D. This lever is supported on the main frame, and is arranged to engage a rack, F, by which it and the axles it operates may be secured in any suitable adjustment in order to secure the wheels at any desired height. To the front of the main frame we secure the hoes H, for barring off the cotton, and hoes I are arranged at the rear of the machine, to side up, such operations of barring off and siding up being well understood by those skilled in the art. The standards i of the hoes I are braced by bars k, extended forward from a cross-rod, K, supported by the main frame. A shaft, M, is journaled transversely of the main frame, and is provided with a drive-wheel, B, arranged to engage the ground when the main frame is lowered. To the shaft M is also secured a gear, b, usually formed on the side of the wheel B. This gear b meshes with a gear, C, on a shaft, j. This shaft is arranged at right angles to shaft M, and is usually journaled at one end in the main frame and at its other end in a bracket, J.

To the shaft j we secure the chopper N, which, it will be seen, is revolved by the drive-wheel B through the gearing before described. Handles L are provided by which to guide the machine.

In operation it will be seen the front hoes will bar off and the rear ones side up the cotton, while the chopping mechanism intermediate said hoes will cut the cotton into stands.

By the lever mechanism the wheels may be set to raise the frame, and with it the cultivating and chopping mechanism, when turning or moving the machine from point to point, and such frame may be lowered to cause such mechanism to operate in the ground to any desired depth.

The machine is simple, and in use operates to economize time and labor.

Having thus described our invention, what we claim as new is—

1. The combination of the main frame, the drive-wheel supported thereby, the chopping mechanism, also supported by the main frame and geared with the drive-wheel, the axles journaled to said main frame and having crank-spindles and cranks e', a connection between cranks e', and an operating-lever, substantially as and for the purposes specified.

2. The combination of the main frame having hoes H H and I I, the axles E, having crank-spindles e e and bell-cranks e', link E', connecting cranks e', the lever D, the shafts M and j, gearing connecting said shafts, a drive-wheel on the shaft M, and a chopping-wheel on the shaft j, substantially as and for the purposes specified.

JASPER WILKINSON.
FRANK CURTIN.

Witnesses:
THOMAS HAYDEN,
JAMES A. HUEY.